United States Patent
Ewald et al.

(10) Patent No.: US 9,543,574 B2
(45) Date of Patent: Jan. 10, 2017

(54) PROCESS FOR PRODUCING ELECTRODE MATERIALS

(71) Applicant: BASF SE, Ludwigshafen (DE)

(72) Inventors: Bastian Ewald, Ludwigshafen (DE); Ivana Krkljus, Ludwigshafen (DE); Jordan Keith Lampert, Ludwigshafen (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 14/398,760

(22) PCT Filed: Apr. 29, 2013

(86) PCT No.: PCT/EP2013/058890
§ 371 (c)(1),
(2) Date: Nov. 4, 2014

(87) PCT Pub. No.: WO2013/171059
PCT Pub. Date: Nov. 21, 2013

(65) Prior Publication Data
US 2015/0118560 A1 Apr. 30, 2015

(30) Foreign Application Priority Data
May 14, 2012 (EP) .................... 12167807

(51) Int. Cl.
*H01M 4/136* (2010.01)
*H01M 4/131* (2010.01)
(Continued)

(52) U.S. Cl.
CPC .............. *H01M 4/136* (2013.01); *C01B 25/45* (2013.01); *C01B 31/02* (2013.01); *H01M 4/131* (2013.01);
(Continued)

(58) Field of Classification Search
None
See application file for complete search history.

(56) References Cited

U.S. PATENT DOCUMENTS

2004/0241546 A1 * 12/2004 Hatta .................... H01M 4/136
429/231.1
2009/0035204 A1 2/2009 Xu et al.

FOREIGN PATENT DOCUMENTS

CN 101339991 A 1/2009
CN 101357756 A 2/2009
(Continued)

OTHER PUBLICATIONS

International Search Report issued Aug. 2, 2013, in PCT/EP2013/058890, filed Apr. 29, 2013.
(Continued)

*Primary Examiner* — Patrick Ryan
*Assistant Examiner* — Wyatt McConnell
(74) *Attorney, Agent, or Firm* — Oblon, McClelland, Maier & Neustadt, L.L.P.

(57) ABSTRACT

The present invention relates to a process for producing electrode materials, which comprises the following steps:
(a) mixing the following with one another:
 (A) at least one phosphorus compound,
 (B) at least one lithium compound,
 (C) at least one carbon source,
 (D1) at least one water-soluble iron compound in which Fe is present in the +2 or +3 oxidation state,
 (D2) at least one iron source which is different than (D1) and is water-insoluble and in which Fe is present in the zero, +2 or +3 oxidation state,
(b) thermally treating the mixture obtained.

18 Claims, 1 Drawing Sheet

Figure 1:
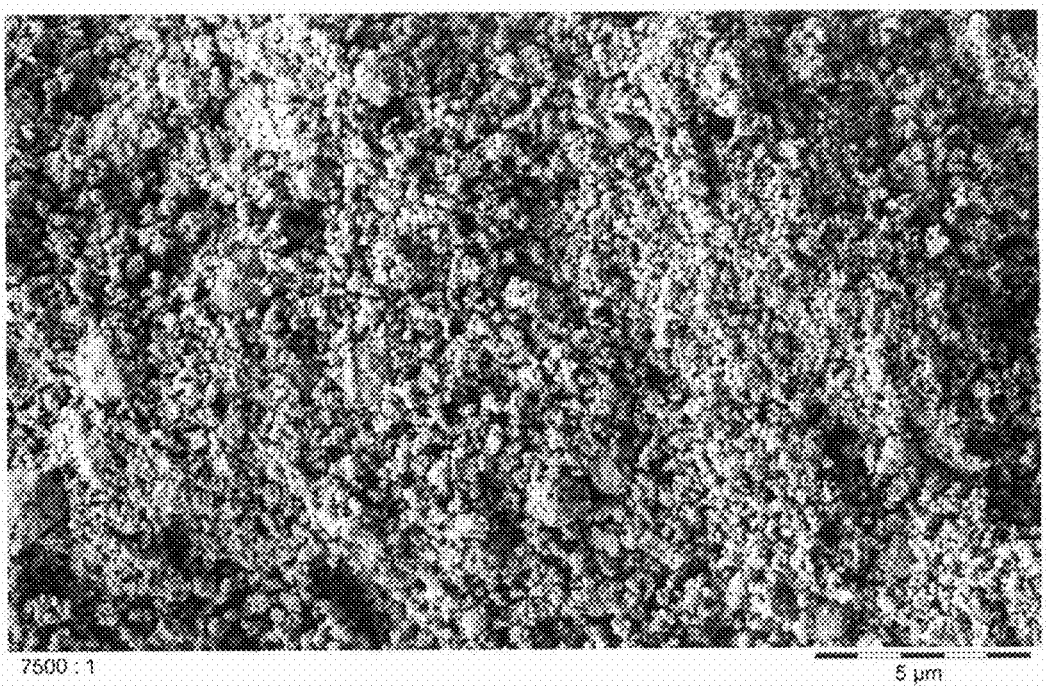

(51) Int. Cl.
    *H01M 4/1391*    (2010.01)
    *H01M 4/58*      (2010.01)
    *C01B 25/45*     (2006.01)
    *C01B 31/02*     (2006.01)

(52) U.S. Cl.
    CPC ......... *H01M 4/1391* (2013.01); *H01M 4/5825* (2013.01); *H01M 2220/30* (2013.01); *Y02E 60/122* (2013.01); *Y02P 70/54* (2015.11)

(56)             References Cited

FOREIGN PATENT DOCUMENTS

| | | |
|---|---|---|
| CN | 101559935 A | 10/2009 |
| JP | 2008-311067 A | 12/2008 |
| JP | 2011-103305 A | 5/2011 |
| JP | 2011-121801 A | 6/2011 |
| WO | 2009/015565 A1 | 2/2009 |

OTHER PUBLICATIONS

Combined Office Action and Search Report issued Jun. 3, 2016 in Chinese Patent Application No. 201380025323.X (with English language translation and English translation of Categories of Cited documents).

\* cited by examiner

PROCESS FOR PRODUCING ELECTRODE MATERIALS

CROSS REFERENCE TO RELATED APPLICATIONS

The present application is a 35 U.S.C. §371 national stage patent application of International patent application PCT/EP2013/058890, filed on Apr. 29, 2013, published as WO/2014/171059 on Nov. 21, 2013, the text of which is incorporated by reference, and claims the benefit of the filing date of European application no. 12167807.2, filed on May 14, 2012, the text of which is also incorporated by reference.

The present invention relates to a process for producing electrode materials, which comprises the following steps:
(a) mixing the following with one another in the presence of water or in the presence of water and organic solvent:
  (A) at least one phosphorus compound,
  (B) at least one lithium compound,
  (C) at least one carbon source,
  (D1) at least one water-soluble iron compound in which Fe is present in the +2 or +3 oxidation state,
  (D2) at least one iron source which is different than (D1) and is water-insoluble and in which Fe is present in the zero, +2 or +3 oxidation state,
(b) thermally treating the mixture obtained.

The present invention further relates to electrode materials and to the use thereof, and to lithium ion batteries comprising electrodes made from this material. Preferred embodiments can be inferred from the claims and the description of the invention. Combinations of preferred embodiments are within the scope of the present invention.

In the search for advantageous electrode materials for batteries which utilize lithium ions as the conductive species, numerous materials have been proposed to date, examples being lithium-containing spinels, mixed oxides with layer structure, for example lithiated nickel manganese cobalt oxides, and lithium iron phosphates.

Lithium iron phosphates are of particular interest because they do not comprise any toxic heavy metals and in many cases are very robust to oxidation and water. A disadvantage of lithium iron phosphates may be the comparatively low energy density.

A process for preparing lithium iron phosphates in the presence of organic solvents for use in lithium ion batteries is disclosed in WO 09/015565.

One problem is that batteries based on lithium iron phosphates are unsatisfactory in some types of application in which a high peak power is required, for example for battery-powered combination drills, which are intended for drilling and screwdriving in concrete. Further examples are starters for motor vehicles and motor cycles. A problem is considered to be that the desired fast discharge in the case of lithium ion batteries based on lithium iron phosphates is not provided.

It was thus an object of the present invention to provide electrochemical cells which comprise a minimum level of toxicologically unsafe electrode materials and which have fast discharge, i.e. a high peak power. It was a further object of the present invention to provide a process by which it is possible to produce electrode materials, and which enable fast discharge, i.e. a high peak power, of the corresponding batteries.

Accordingly, the process defined at the outset has been found, also referred to hereinafter as process according to the invention.

To perform the process according to the invention, in stage (a), two or more of the starting materials, preferably all starting materials involved, are mixed in several steps or preferably in one step. Suitable vessels for the mixing are, for example, stirred tanks and stirred flasks.

The starting materials are characterized further hereinafter.

The starting material (A) selected is at least one phosphorus compound, also called phosphorus compound (A) hereinafter, selected from phosphorus hydrides and compounds in which phosphorus is present in the +1 or +3 or +5 oxidation state, for example phosphines having at least one alkyl group or at least one alkoxy group per molecule, phosphorus halides, phosphonic acid, hypophosphorous acid and phosphoric acid. Preferred phosphines are those of the general formula (I)

$$P(R^1)_r(X^1)_s H_t \qquad (I)$$

where the variables are each selected as follows:
$R^1$ may be different or the same and is selected from phenyl and preferably $C_1$-$C_{10}$-alkyl, cyclic or linear, for example methyl, ethyl, n-propyl, isopropyl, n-butyl, isobutyl, sec-butyl, tert-butyl, n-pentyl, cyclopentyl, isoamyl, isopentyl, n-hexyl, isohexyl, cyclohexyl and 1,3-dimethylbutyl, preferably n-$C_1$-$C_6$-alkyl, more preferably methyl, ethyl, n-propyl, isopropyl, and most preferably methyl or ethyl. If a substance has two or more alkoxy groups per mole, $R^1$ may be different or preferably the same and may be selected from the aforementioned $C_1$-$C_6$-alkyl radicals.
$X^1$ may be different or the same and is selected from halogen, hydroxyl groups, phenoxy groups and alkoxy groups, preferably of the formula $OR^1$, especially methoxy and ethoxy, and where halogen is preferably bromine and more preferably chlorine,
r, s are selected from integers in the range from zero to three,
t is selected from integers in the range from zero to two,
where the sum of r+s+t=3, and where
at least one of the inequations $$r \neq 0$$

$$s \neq 0$$

is satisfied.

In one embodiment of the present invention, phosphorus compound (A) is selected from compounds of the general formula $P(OR^1)_3$, where $R^1$ may be different or preferably the same and may be selected from phenyl and $C_1$-$C_{10}$-alkyl, particular preference being given to $P(OCH_3)_3$ and $P(OC_2H_5)_3$.

In one embodiment of the present invention, phosphorus compound (A) is selected from compounds of the general formula $O=P(OR^1)_3$, where $R^1$ may be different or preferably the same and may be selected from phenyl and $C_1$-$C_{10}$-alkyl, particular preference being given to $O=P(OCH_3)_3$ and $O=P(OC_2H_5)_3$.

In one embodiment of the present invention, phosphorus compound (A) is selected from compounds of the general formula $O=P(R^1)_3$, where $R^1$ may be different or preferably the same and may be selected from phenyl and $C_1$-$C_{10}$-alkyl, particular preference being given to $O=P(C_6H_5)_3$, $O=P(CH_3)_3$ and $O=P(C_2H_5)_3$.

The phosphonic acid, hypophosphorous acid and phosphoric acid selected may in each case be the free acid or corresponding salts, especially lithium and ammonium salts. The phosphoric acid and phosphonic acid selected may in each case be the mononuclear acids $H_3PO_3$ and $H_3PO_4$, but additionally also di-, tri- or polynuclear acids, for example $H_4P_2O_7$ or polyphosphoric acid. In another variant, a compound of mixed condensation is selected, for example obtainable by condensation of phosphoric acid with phosphorous acid.

In one embodiment of the present invention, two or more phosphorus compounds (A) are selected as starting material (A). In another embodiment of the present invention, exactly one phosphorus compound (A) is selected.

The starting material (B) selected is at least one lithium compound, also called lithium compound (B), preferably at least one inorganic lithium compound. Examples of suitable inorganic lithium compounds are lithium halides, for example lithium chloride, and also lithium sulfate, lithium acetate, LiOH, $Li_2CO_3$, $Li_2O$ and $LiNO_3$; preference is given to $Li_2SO_4$, LiOH, $Li_2CO_3$, $Li_2O$ and $LiNO_3$. Lithium compound may comprise water of crystallization, for example $LiOH.H_2O$.

In a specific embodiment of the present invention, the phosphorus compound (A) and lithium compound (B) selected in each case is $LiH_2PO_2$, lithium phosphate, lithium orthophosphate, lithium metaphosphate, lithium phosphonate, lithium phosphite, lithium hydrogenphosphate or lithium dihydrogenphosphate, which means that lithium phosphate, lithium phosphonate, lithium phosphite or lithium (di)hydrogenphosphate can each serve simultaneously as the phosphorus compound (A) and as the lithium compound (B).

The starting material (C) selected is at least one carbon source, also called carbon source (C) for short, which may be a separate carbon source or be at least one phosphorus compound (A) or lithium compound (B).

A separate carbon source (C) shall be understood in the context of this invention to mean that a further starting material is used which is selected from elemental carbon in a polymorph which conducts the electrical current, or a compound which is decomposed to carbon in the course of the thermal treatment in step (b) and which is different than phosphorus compound (A) and lithium compound (B).

An example of a suitable carbon source (C) is carbon in a polymorph which conducts the electrical current, i.e., for example, carbon black, graphite, graphene, carbon nanotubes or activated carbon.

Examples of graphite are not only mineral and synthetic graphite, but also expanded graphites and intercalated graphite.

Carbon black can be selected, for example, from lamp black, furnace black, flame black, thermal black, acetylene black and industrial black. Carbon black may comprise impurities, for example hydrocarbons, especially aromatic hydrocarbons, or oxygen-containing compounds or oxygen-containing groups, for example OH groups. In addition, sulfur- or iron-containing impurities are possible in carbon black. In a further variant, modified carbon blacks or modified graphites are used, for example those carbon blacks or graphites which have hydroxyl groups, epoxy groups, keto groups or carboxyl groups.

Further suitable carbon sources (C) are compounds of carbon which are decomposed to carbon in the course of thermal treatment in step (c). Suitable examples are synthetic and natural polymers, unmodified or modified. Examples of synthetic polymers are polyolefins, for example polyethylene and polypropylene, and also polyacrylonitrile, polybutadiene, polystyrene, and copolymers of at least two comonomers selected from ethylene, propylene, styrene, (meth)acrylonitrile and 1,3-butadiene. Also suitable are polyisoprene and polyacrylates. Particular preference is given to polyacrylonitrile.

Polyacrylonitrile is understood in the context of the present invention to mean not just polyacrylonitrile homopolymers but also copolymers of acrylonitrile with 1,3-butadiene or styrene. Preference is given to polyacrylonitrile homopolymers.

In the context of the present invention, polyethylene is understood to mean not just homopolyethylene but also copolymers of ethylene which comprise at least 50 mol % of ethylene in copolymerized form and up to 50 mol % of at least one further comonomer, for example $\alpha$-olefins such as propylene, butylene (1-butene), 1-hexene, 1-octene, 1-decene, 1-dodecene, 1-pentene, and also isobutene, vinylaromatics, for example styrene, and also (meth)acrylic acid, vinyl acetate, vinyl propionate, $C_1$-$C_{10}$-alkyl esters of (meth)acrylic acid, especially methyl acrylate, methyl methacrylate, ethyl acrylate, ethyl methacrylate, n-butyl acrylate, 2-ethylhexyl acrylate, n-butyl methacrylate, 2-ethylhexyl methacrylate, and also maleic acid, maleic anhydride and itaconic anhydride. Polyethylene may be HDPE or LDPE.

In the context of the present invention, polypropylene is understood to mean not just homopolypropylene but also copolymers of propylene which comprise at least 50 mol % of propylene in copolymerized form and up to 50 mol % of at least one further comonomer, for example ethylene and $\alpha$-olefins such as butylene, 1-hexene, 1-octene, 1-decene, 1-dodecene and 1-pentene. Polypropylene is preferably isotactic or essentially isotactic polypropylene.

In the context of the present invention, polystyrene is understood to mean not just homopolymers of styrene but also copolymers with acrylonitrile, 1,3-butadiene, (meth)acrylic acid, $C_1$-$C_{10}$-alkyl esters of (meth)acrylic acid, divinylbenzene, especially 1,3-divinylbenzene, 1,2-diphenylethylene and $\alpha$-methylstyrene.

A further suitable synthetic polymer is polyvinyl alcohol.

Natural polymers suitable as carbon sources (C) are, for example, starch, cellulose, alginates (e.g. agar-agar), and also pectins, gum arabic, oligo- and polysaccharides, guar flour and carob flour, and also amylose and amylopectin.

Also suitable are modified natural polymers. These are understood to mean natural polymers modified by polymer-analogous reaction. Suitable polymer-analogous reactions are especially esterification and etherification. Preferred examples of modified natural polymers are methanol-etherified starch, acetylated starch and acetylcellulose, and also phosphated and sulfated starch.

Additionally suitable as carbon sources (C) are carbides, preferably covalent carbides, for example iron carbide $Fe_3C$.

Further suitable carbon sources (C) are nonvolatile, low molecular weight organic compounds. Especially suitable are those compounds which do not vaporize at temperatures in the range from 350 to 1200° C., but rather decompose, for example as solids or in the melt. Examples are dicarboxylic acids, for example phthalic acid, phthalic anhydride, isophthalic acid, terephthalic acid, tartaric acid, citric acid, pyruvic acid, and also sugars, for example monosaccharides having 3 to 7 carbon atoms per molecule (trioses, tetroses, pentoses, hexoses, heptoses) and condensates of monosaccharides, for example di-, tri- and oligosaccharides, especially lactose, glucose and fructose, and also sugar alcohols and sugar acids, for example aldonic acids, ketoaldonic acids, uronic acids and aldaric acids, especially galactonic acid.

Further examples of low molecular weight organic compounds as carbon source (C) are urea and the less volatile condensates thereof: biuret, melamine, melam (N2-(4,6- diamino-1,3,5-triazin-2-yl)-1,3,5-triazine-2,4,6-triamine) and melem (1,3,4,6,7,9,9b-heptaazaphenalene-2,5,8-triamine).

Further examples of carbon sources (C) are salts, preferably iron salts, ammonium salts and alkali metal salts, more preferably iron, sodium, potassium, ammonium or lithium salts, of organic acids, for example alkanoates, especially acetates, propionates, butyrates, and also lactates, citrates, tartrates and benzoates. Particularly preferred examples are ammonium acetate, potassium ammonium tartrate, potassium hydrogen tartrate, potassium sodium tartrate, sodium tartrate (disodium tartrate), sodium hydrogen tartrate, lithium hydrogen tartrate, lithium ammonium tartrate, lithium tartrate, lithium citrate, potassium citrate, sodium citrate, iron acetate, lithium acetate, sodium acetate, potassium acetate, lithium lactate, ammonium lactate, sodium lactate and potassium lactate.

In a specific embodiment of the present invention, the carbon source (C) and phosphorus compound (A) selected is an organic phosphorus compound, examples of which include trimethyl phosphate, triethyl phosphate, triphenylphosphine and triphenylphosphine oxide $(C_6H_5)_3PO$.

In a specific embodiment of the present invention, the carbon source (C) and lithium compound (B) selected is lithium acetate, lithium lactate or lithium hydrogen tartrate, i.e. lithium compound (B) lithium acetate, lithium lactate or lithium hydrogen tartrate can in each case serve simultaneously as the carbon source (C).

In one embodiment of the present invention, two or more different carbon sources are selected, for example two different carbon sources or three different carbon sources. In another embodiment of the present invention, exactly one carbon source (C) is selected.

As starting material (D), at least two iron compounds or iron and at least one iron compound
(D1) are selected. The following are selected:
(D1) at least one water-soluble iron compound in which Fe is present in the +2 or +3 oxidation state, also referred to as "iron compound (D1)" or "component (D1)" for short, and
(D2) at least one iron source which is different than (D1) and is water-insoluble and in which Fe is present in the zero, +2 or +3 oxidation state.

For example, the iron source (D2) selected may be iron or preferably at least one water-insoluble iron compound, in which Fe is present in the zero, +2 or +3 oxidation state, also referred to as "iron compound (D2)" or "component (D2)" for short.

"In the +2 or +3 oxidation state" means the oxidation state in which Fe is present in the iron compound (D1) or iron compound (D2) in question at the start of the mixing in step (a). "Water-soluble" in connection with iron compound (D1) is understood to mean that the solubility in demineralized water at a pH of 7 and 20° C. is at least 0.1 g of Fe ions/l, preferably in the range from 1 to 500 g/l.

"Water-insoluble" in connection with iron compound (D2) is understood to mean that the solubility in demineralized water at a pH of 7 and 20° C. is less than 0.1 g of Fe ions/l, for example $10^{-10}$ to 0.01 g/l.

Iron compound (D1) and iron compound (D2) are preferably inorganic iron compounds.

Iron compound (D1) can be selected from anhydrous and hydrous iron compounds, for example the hydrates. Hydrates shall be understood to mean not just monohydrates but also other hydrates, for example in the case of iron(II) oxalate also the dihydrate, in the case of iron(II) chloride also the tetrahydrate, and in the case of iron(III) nitrate also the nonahydrate.

In one embodiment of the present invention, water-soluble iron compound (D1) is selected from ammonium iron(II) sulfate, ammonium iron(III) sulfate, ammonium iron(II) citrate, ammonium iron(III) citrate, iron(II) bromide, iron(III) bromide, iron(II) fluoride, iron(III) fluoride, iron(II) ethoxide, iron(II) gluconate, iron(II) nitrate, iron(III) nitrate, iron(II) acetate, $FeSO_4$, $Fe_2(SO_4)_3$, iron(II) oxalate, iron(II) citrate, iron(III) citrate, iron(III) acetylacetonate, iron(II) lactate, iron(III) lactate and iron chloride, for example $FeCl_2$ and hydrous iron(III) chloride.

In one embodiment of the present invention, water-insoluble iron compound (D2) is selected from $Fe(OH)_3$, FeOOH, $Fe_2O_3$.aq, FeO, $Fe_2O_3$, $Fe_3O_4$, FeS, iron(II) phosphate $(Fe_3(PO_4)_2)$, iron(III) phosphate $(FePO_4)$, iron(II) pyrophosphate, iron(III) pyrophosphate, iron carbide, iron phosphide, iron(II) phosphonate, iron(III) phosphonate and iron carbonate, preference being given to $Fe(OH)_3$, FeOOH, $Fe_2O_3$, $Fe_3O_4$, iron phosphate and iron(II) carbonate.

Iron compound (D1) and (D2) can each be selected from anhydrous and hydrous iron compounds, for example the hydrates. Hydrates shall be understood to mean not just monohydrates but also other hydrates, for example in the case of iron(II) phosphate also the octahydrate.

In one embodiment of the present invention, water-insoluble iron compound (D2) is selected from iron pentacarbonyl.

Starting material (D1) can be used, for example, as an aqueous solution or as a powder, for example with mean particle diameters (D50) in the range from 10 to 750 nm, preferably in the range from 25 to 500 nm. Starting material (D2) can be used, for example, as an aqueous suspension or as a powder, for example with mean primary particle diameters (D50) in the range from 10 to 750 nm, preferably in the range from 25 to 500 nm.

In one embodiment of the present invention, starting material (D2) may be in the form of agglomerates.

In a specific embodiment of the present invention, the carbon source (C) and iron compound (D1) selected is iron acetate, iron citrate, iron gluconate, iron ethoxide or ammonium iron citrate, i.e. the iron compound (D1) iron(II) acetate, iron(II) acetylacetonate, iron(II) citrate, iron(II) lactate, iron(III) lactate, ammonium iron(II) citrate, iron(III) acetate, iron(III) acetylacetonate, iron(III) citrate or ammonium iron(III) citrate can serve simultaneously as the carbon source (C).

In a specific embodiment of the present invention, the carbon source (C) and iron compound (D2) selected is iron carbide.

In a specific embodiment of the present invention, the iron compound (D1), carbon source (C) and lithium compound (B) selected is lithium iron citrate, i.e. lithium iron citrate can serve simultaneously as the iron compound (D1), carbon source (C) and lithium compound (B).

In one embodiment of the present invention, iron compound (D1) and iron compound (D2) are selected in a molar ratio of 1:1 to 1:9, preferably up to 15:85, the molar ratio being based on Fe in iron compound (D1) or iron compound (D2) (i.e. elemental iron).

In one embodiment of the present invention, one iron compound (D1) and two iron compounds (D2) are used. In another embodiment of the present invention, one iron compound (D2) and two iron compounds (D1) are used.

In one embodiment of the present invention, two phosphorus compounds (A), one lithium compound (B), one carbon source (C), one iron compound (D1) and one iron compound (D2) are used.

In a preferred embodiment of the present invention, two phosphorus compounds (A), one lithium compound (B), two carbon sources (C), one iron compound (D1) and one iron compound (D2) are used.

In a preferred embodiment of the present invention, two phosphorus compounds (A), one lithium compound (B), two carbon sources (C), one iron compound (D1) and one iron compound (D2) are used, iron compound (D1) being a salt of an organic compound and serving as one of the carbon sources (C).

In one embodiment of the present invention, in step (a), one or more reducing compounds can be used; for example, one or more reducing agents (E) can be used. This embodiment is preferred when at least one iron compound (D1) or (D2) in which Fe is present in the +3 oxidation state is used. Suitable reducing compounds are, for example, those phosphorus compounds (A) in which P is present in the +3 or +1 oxidation state, especially phosphorous acid ($H_3PO_3$), hypophosphorous acid ($H_3PO_2$) and the respective ammonium and lithium salts and esters thereof, for example $C_1$-$C_{10}$-alkyl esters. A further suitable reducing agent (E) is elemental iron.

The reducing agents (E) used may be gaseous, liquid or solid substances which convert iron, if required, to the +2 oxidation state under the conditions of step (a) or (b).

In one embodiment of the present invention, the solid reducing agent (E) selected is a metal, for example nickel or manganese, or a metal hydride.

The gaseous reducing agent (E) used may be, for example, hydrogen, carbon monoxide, ammonia and/or methane. If it is desirable to use one or more gaseous reducing agents (E), it is preferable to use the gaseous reducing agent(s) (E) in step (b), which is explained in detail below.

Further suitable reducing agents (E) are metallic iron and iron pentacarbonyl.

In another embodiment of the present invention, no reducing agent (E) is used.

In one embodiment of the present invention, in step (a), the ratios of iron compounds (D1) and (D2), of phosphorus compound(s) (A) and lithium compound(s) (B) are selected such that the desired stoichiometry of an iron compound which is intended for use as an electrode material is satisfied. For instance, in step (a), the ratios of iron compounds (D1) and (D2), of phosphorus compound(s) (A) and lithium compound(s) (B) can be selected such that the stoichiometry gives rise, for example, to $Li_3Fe_2(PO_4)_3$, $Li_2Fe_2(PO_4)_2$, $Li_4Fe(PO_4)_2$ or $Li_2FeP_2O_7$, or more particularly $LiFePO_4$.

The starting material (F) used may be at least one further metal compound in which the metal(s) are different than iron, also called metal compound (F) for short. The metal selected is preferably one or more metals from the first period of the transition metals. Particular preference is given to selecting metal compound (F) from compounds of Ti, V, Cr, Mn, Co, Ni, Mg, Al, Nb, W, Mo, Cu and Zn, especially from compounds of Sc, Ti, V, Mn, Ni and Co. Very particular preference is given to selecting metal compound (F) from oxides, hydroxides, carbonates and sulfates of metals of the first period of the transition metals.

Metal compound (F) may be anhydrous or hydrous. Metal cation in metal compound (F) may be in complexed form, for example as a hydrate complex, or uncomplexed form.

Metal compound (F) may be a salt, for example halide, especially chloride, and also nitrate, carbonate, sulfate, oxide, hydroxide, acetate, citrate, tartrate, oxalate or acetylacetonate, or salts with different anions. Preference is given to selecting salts from oxides, carbonates, hydroxides and nitrates, in basic or neutral form. Very particularly preferred examples of metal compounds (F) are oxides, hydroxides, carbonates and sulfates.

In another embodiment of the present invention, metal compound (F) is selected from fluorides, for example as an alkali metal fluoride, especially sodium fluoride.

In one embodiment of the present invention, metal compound (F) can act as one or the only carbon source (C), examples of which include nickel acetate, cobalt acetate, zinc acetate and manganese(II) acetate.

In one embodiment of the present invention, metal compound (F) can act as one or the only reducing agent (E). Examples include manganese(II) acetate, $MnCO_3$, $MnSO_4$, nickel lactate, manganese hydride, nickel hydride, nickel suboxide, nickel carbide, manganese carbide and manganese (II) lactate.

According to the invention, components (A) to (D2) are mixed with one another in the presence of water. The presence of water is understood to mean in particular that preferably at least 20% by weight, more preferably at least 40% by weight, especially at least 60% by weight, of water is used, based in each case on the total mass of components (A) to (D2) and water. Usually, not more than 90% by weight of water is used, based on the total mass of components (A) to (D2) and water.

In one variant, water and organic solvent (G) are added. Examples of suitable organic solvents are especially halogen-free organic solvents (G) such as methanol, ethanol, isopropanol or n-hexane, cyclohexane, acetone, ethyl acetate, diethyl ether and diisopropyl ether. If organic solvent is used as well, it is preferably present in minor amounts. In general, the proportion of organic solvent is not more than 5% by weight, based on the amount of water. Preferably, the proportions are considerably smaller, for example down to 2% by weight or 1% by weight. Often, the proportion of organic solvent is only within the range of impurities that occur in water.

It is preferable to use water in step (a), but no organic solvent (G). Water of various qualities may be used. More particularly, purified, preferably demineralized, water is used.

Without any intention to give preference to a particular theory, it is possible that certain organic solvents (G) such as secondary or primary alkanols can also act as reducing agents (E).

The mixing in step (a) can be conducted, for example, by stirring one or more suspensions of the starting materials (A) to (D2) and optionally (E), (F) and (G). In other embodiments, the starting materials (A) to (D) and optionally (E) and (F) are mixed intimately with one another as solids. In another embodiment of the present invention, the starting materials (A) to (D2) and optionally (E) and (F) and (G) can be kneaded with one another to give a paste.

In one embodiment of the present invention, the mixing in step (a) is performed at temperatures in the range from zero to 200° C., preference being given to conducting it at temperatures in the range from room temperature up to 110° C., more preferably to 80° C.

In one embodiment of the present invention, the mixing in step (a) is conducted at standard pressure. In other embodiments, the mixing is conducted at elevated pressure, for example at 1.1 up to 20 bar. In other embodiments, the mixing in step (a) is conducted at reduced pressure, for example at 10 mbar up to 990 mbar.

The mixing in step (a) can be conducted over a period in the range from one minute up to 12 hours, preferably 15 minutes to 4 hours, more preferably 20 minutes to 2 hours.

In one embodiment of the present invention, the mixing in step (a) is conducted in one stage.

In another embodiment, the mixing in step (a) is conducted in two or more stages. For example, it is possible first to dissolve or to suspend iron compound (D1) and lithium compound (B) together in water, then to mix them with phosphorus compound (A) and carbon source (C), and also iron compound (D2), and then optionally to mix them with reducing agent (E) and/or further metal compound (F).

In one embodiment, water and/or organic solvent is first initially charged, followed by successive addition of lithium compound (B), iron compound (D1) and iron compound (D2), phosphorus or phosphorus compound (C), carbon source (B), and optionally reducing agent (E) and/or further metal compound (F).

Step (a) affords a mixture of at least one phosphorus compound (A), at least one lithium compound (B), at least one carbon source (C), at least one iron compound (D1), at least one iron compound (D2), optionally reducing agent (E), optionally further metal compound (F), water and any organic solvent (G), in pasty form, as a hydrous powder, as a suspension or as a solution.

Prior to the actual thermal treatment in step (b), mixture from step (a) can be dried.

The procedure for drying may, for example, be to evaporate water and any organic solvent (G) for example by distillative removal, freeze drying, preferably by atomization drying, and especially by spray drying.

In one embodiment of the present invention, the mixture from step (a) is dried, for example, with an atomization dryer. Suitable examples are atomization dryers with disk atomizers, with pressure nozzle atomization, and those with two-phase nozzle atomization, especially with internally mixing two-phase nozzles.

In one embodiment of the present invention, the mixture from step (a) is spray-dried with the aid of at least one apparatus which makes use of at least one spray nozzle for spraying, i.e. spray drying or atomization drying is conducted. The spray drying can be conducted in a spray dryer. Suitable spray dryers are drying towers, for example drying towers with one or more atomization nozzles, and spray dryers with an integrated fluidized bed.

Particularly preferred nozzles are two-phase nozzles, i.e. nozzles wherein substances of different states of matter are mixed vigorously by means of separate feeds in the interior thereof or at the openings thereof. Further examples of suitable nozzles are combined nozzles, for example combinations of two-phase and pressure nozzles.

The procedure for performance of the drying may be, in one variant, to force the mixture obtained in step (a) through one or more spray devices, for example through one or more nozzles or into a hot air stream or into a hot inert gas stream or hot burner offgases, in which case the hot gas stream or the hot inert gas stream or the hot burner offgases may have a temperature in the range from 170 to 550° C., preferably 200 to 350° C., especially 250 to 330° C. As a result, the mixture is dried within fractions of a second or within a few seconds to give a dry material, which is preferably obtained as a powder. The powder obtained may have a certain residual moisture content, for example in the range from 500 ppm to 10% by weight, preferably in the range from 1 to 8% by weight, more preferably in the range from 2 to 6% by weight.

The exit temperature of the gas stream may, for example, be in the range from 90 to 190° C., preferably 110 to 170° C., especially 125 to 150° C.

In a preferred embodiment, the temperature of the hot air stream or of the hot inert gas stream or of the hot burner offgases is selected such that it is above the temperature in step (a).

In one embodiment of the present invention, the hot air stream or the hot inert gas stream or the hot burner offgases flow in the direction with the mixture introduced from step (a) (cocurrent process). In another embodiment of the present invention, the hot air stream or hot inert gas stream the hot burner offgases flow in the opposite direction to the mixture introduced from step (a) (countercurrent process). The spray device is preferably in the upper part of the spray dryer, especially of the spray tower.

Dry material obtained can be separated from the hot air stream or hot inert gas stream or from the hot burner offgases after the actual spray drying by means of a separator, for example a cyclone. In another embodiment, dry material obtained is separated from the hot air stream or hot inert gas stream or from the hot burner offgases by means of one or more filters after the actual spray drying.

Dry material may have, for example, a mean particle diameter (D50, weight average) in the range from 1 to 50 μm. It is preferable when the mean particle diameter (D99) (determined as the volume average) is up to 120 μm, more preferably up to 50 μm and most preferably up to 20 μm.

The drying can be performed batchwise or else continuously.

In step (b) of the process according to the invention, the mixture from step (a) or the dry material is treated thermally, preferably at temperatures in the range from 350 to 1200° C., preferably 400 to 900° C.

In one embodiment of the present invention, the thermal treatment in step (b) is conducted in a temperature profile with two to five and preferably with three or four zones, in which case each zone of the temperature profile preferably has a higher temperature than the preceding zone. For example, a temperature in the range from 350 to 550° C. can be established in a first zone, and in the range from 450 to 750° C. in a second zone, the temperature being higher than in the first zone. If introduction of a third zone is desired, thermal treatment can be effected at 700 to 1200° C. in the third zone, but in any case at a temperature higher than in the second zone. The zones can be produced, for example, by the establishment of particular heating zones.

If batchwise performance of step (b) is desired, it is possible to establish a temperature profile against time, which means that treatment is effected, for example, first at 350 to 550° C., then at 450 to 750° C., the temperature being higher than in the first phase. If introduction of a third phase is desired, thermal treatment can be effected at 700 to 1200° C. in the third phase, but in any case at a temperature higher than in the second phase.

The thermal treatment in step (b) can be performed, for example, in a rotary tube furnace, a push-through furnace or RHK (roller hearth kiln), a pendulum reactor, a muffle furnace, a calcination furnace or a quartz sphere furnace.

The thermal treatment in step (b) can be performed, for example, in a weakly oxidizing atmosphere, preferably in inert or reducing atmosphere.

"Weakly oxidizing" in the context of the present invention is understood to mean an oxygen-containing nitrogen atmosphere comprising up to 2% by volume of oxygen, preferably up to 1% by volume.

Examples of inert atmospheres are a noble gas atmosphere, especially argon atmosphere, and nitrogen atmosphere. Examples of a reducing atmosphere are nitrogen or noble gases which comprise 0.1 to 10% by volume of carbon monoxide, ammonia, hydrogen or hydrocarbon, especially methane. Further examples of a reducing atmosphere are air or nitrogen- or carbon dioxide-enriched air, in each case comprising more mol % of carbon monoxide, hydrogen or hydrocarbon than oxygen.

In one embodiment of the present invention, step (b) can be performed over a period in the range from 1 minute up to 24 hours, preferably in the range from 10 minutes to 3 hours.

The process according to the invention can be performed without any great dust nuisance. The process according to the invention makes it possible to obtain electrode materials with excellent rheological properties, which are suitable as electrode materials and can be processed very efficiently. For example, they can be processed to pastes with good rheological properties; such pastes have a relatively low viscosity.

Materials produced by the process according to the invention are notable for very good rate capability, i.e. very good capacity coupled with high discharge rate. They are therefore very suitable for operation of devices such as drills and battery-powered combination drills.

The present invention further provides electrode materials in particulate form, comprising agglomerates of primary particles, said agglomerates comprising
i. primary particles of lithiated iron phosphate with olivine structure, also called "primary particles (i)" for short, said primary particles (i) having a mean diameter (D50) in the range from 20 to 250 nm, preferably 50 to 150 nm,
ii. primary particles of lithiated iron phosphate with olivine structure, also called "primary particles (ii)" for short, said primary particles (ii) having a mean diameter (D50) in the range from 300 to 1000 nm, preferably 350 to 750 nm,
iii. optionally carbon in an electrically conductive polymorph, also called "carbon (iii)" for short.

Carbon (iii) may have a mean particle diameter (D50) (primary particle diameter) in the range from 1 to 500 nm, preferably in the range from 2 to 100 nm, more preferably in the range from 3 to 50 nm, most preferably in the range from 4 to 10 nm. Particle diameters of carbon (iii) in the context of the present invention are preferably reported as volume averages, determinable, for example, by XRD analysis and by imaging processes such as SEM/TEM.

The mean diameter of primary particles (i) and primary particles (ii) can be detected by XRD analysis and by imaging processes such as SEM/TEM, and the diameters of the secondary particles (ii), for example, by laser diffraction on dispersions (in gaseous or liquid form).

In one embodiment of the present invention, primary particles (i) and primary particles (ii) are present in agglomerates in a volume ratio (D50) in the range from 1:9 to 1:1.

In one embodiment of the present invention, the weight ratio of the sum of primary particles (i) and primary particles (ii) to carbon (iii) is in the range from 200:1 to 5:1, preferably 100:1 to 10:1, more preferably 100:1.5 to 20:1.

Carbon (iii) may be present in the pores of secondary particles (agglomerates) of primary particles (i) and primary particles (ii), or in the form of particles which can form point contacts with agglomerates of primary particles (i) and primary particles (ii) or form contacts with one or more particles of carbon (iii).

In another embodiment of the present invention, carbon (iii) may be present as a coating of agglomerates of primary particles (i) and primary particles (ii), as a complete coating or as a partial coating. Any such partial coating may, for example, also be within agglomerates of primary particles (i) and primary particles (ii), i.e. in pores.

In one embodiment of the present invention, carbon (iii) and agglomerates of primary particles (i) and primary particles (ii) are present in discrete particles alongside one another, which may either have point contacts with one another or no contact at all.

In one embodiment of the present invention, carbon (iii) is present partly as a coating of agglomerates of primary particles (i) and primary particles (ii), or else in the form of separate particles.

The above-described morphology of carbon (iii) and of agglomerates of primary particles (i) and primary particles (ii) can be detected, for example, by light microscopy, transmission electron microscopy (TEM) or scanning electron microscopy (SEM), or SEM on section images, and also, for example, by X-ray analysis on the diffraction pattern.

In one embodiment of the present invention, agglomerates of primary particles (i) and primary particles (ii) are in the form of particles having a mean particle diameter in the range from 1 to 150 µm (D50). Preferred mean particle diameters (D50) of the agglomerates are in the range from 1 to 50 µm, more preferably in the range from 1 to 30 µm, determinable, for example, by laser diffraction.

In one embodiment of the present invention, agglomerates of primary particles (i) and primary particles (ii) are in the form of particles which have a mean pore diameter in the range from 0.05 µm to 2 µm and which may be present in agglomerates. The mean pore diameter can be determined, for example, by mercury porosimetry, for example to DIN 66133.

In one embodiment of the present invention, agglomerates of primary particles (i) and primary particles (ii) are in the form of particles which have a mean pore diameter in the range from 0.05 µm to 2 µm and exhibit a mono- or multimodal profile of the intrusion volumes in the range of 100 to 0.001 µm and preferably have a pronounced maximum in the range between 10 µm and 1 µm, preferably two pronounced maxima, one each between 10 and 1 µm and between 1 and 0.1 µm.

Carbon (iii) is, for example, carbon black, graphite, graphene, carbon nanotubes, expanded graphites, intercalated graphites or activated carbon.

In one embodiment of the present invention, carbon (iii) is carbon black. Carbon black may be selected, for example, from lamp black, furnace black, flame black, thermal black, acetylene black and industrial black. Carbon black may comprise impurities, for example hydrocarbons, especially aromatic hydrocarbons, or oxygen-containing compounds or oxygen-containing groups, for example OH groups, epoxide groups, carbonyl groups and/or carboxyl groups. In addition, sulfur- or iron-containing impurities are possible in carbon black.

In one variant, carbon (iii) is partially oxidized carbon black. Partially oxidized carbon black, also called activated carbon black, comprises oxygen-containing groups, for example OH groups, epoxide groups, carbonyl groups and/or carboxyl groups.

In one embodiment of the present invention, carbon (iii) comprises carbon nanotubes. Carbon nanotubes (CNTs for short), for example single-wall carbon nanotubes (SW CNTs) and preferably multiwall carbon nanotubes (MW CNTs), are known per se. A process for production thereof and some properties are described, for example, by A. Jess et al. in *Chemie Ingenieur Technik* 2006, 78, 94-100.

In one embodiment of the present invention, carbon nanotubes have a diameter in the range from 0.4 to 50 nm, preferably 1 to 25 nm.

In one embodiment of the present invention, carbon nanotubes have a length in the range from 10 nm to 1 mm, preferably 100 nm to 500 nm.

Carbon nanotubes can be produced by processes known per se. For example, a volatile carbonaceous compound, for example methane or carbon monoxide, acetylene or ethylene, or a mixture of volatile carbonaceous compounds, for example synthesis gas, can be decomposed in the presence of one or more reducing agents, for example hydrogen and/or a further gas, for example nitrogen. Another suitable gas mixture is a mixture of carbon monoxide with ethylene. Suitable temperatures for decomposition are, for example, within the range from 400 to 1000° C., preferably 500 to 800° C. Suitable pressure conditions for the decomposition are, for example, in the range from standard pressure to 100 bar, preferably to 10 bar.

Single- or multiwall carbon nanotubes can be obtained, for example, by decomposition of carbonaceous compounds in a light arc, and in the presence or absence of a decomposition catalyst.

In one embodiment, the decomposition of volatile carbonaceous compound(s) is performed in the presence of a decomposition catalyst, for example Fe, Co or preferably Ni.

Graphene is understood in the context of the present invention to mean almost ideally or ideally two-dimensional hexagonal carbon crystals of analogous structure to individual graphite layers. They may have a thickness of one carbon atom layer or of only a few, for example 2 to 5, carbon atom layers. Graphene can be produced by exfoliation or by delamination of graphite.

Intercalated graphites are understood in the context of the present invention to mean incompletely delaminated graphites which comprise other atoms, ions or compounds intercalated between the hexagonal carbon atom layers. Examples of possible intercalations include alkali metal ions, $SO_3$, nitrate or acetate. The preparation of intercalated graphites (also: expandable graphites) is known; see, for example, Rüdorff, Z. anorg. Allg. Chem. 1938, 238(1), 1. Intercalated graphites can be produced, for example, by thermal expansion of graphite.

Expanded graphites can be obtained, for example, by expansion of intercalated graphites; see, for example, McAllister et al. Chem. Mater. 2007, 19, 4396-4404.

In one embodiment of the present invention, inventive electrode materials are those which have been produced by the above-described process according to the invention.

In one embodiment of the present invention, inventive electrode material additionally comprises at least one binder (iv), for example a polymeric binder.

Suitable binders (iv) are preferably selected from organic (co)polymers. Suitable (co)polymers, i.e. homopolymers or copolymers, can be selected, for example, from (co)polymers obtainable by anionic, catalytic or free-radical (co)polymerization, especially from polyethylene, polyacrylonitrile, polybutadiene, polystyrene, and copolymers of at least two comonomers selected from ethylene, propylene, styrene, (meth)acrylonitrile and 1,3-butadiene. Polypropylene is also suitable. Additionally suitable are polyisoprene and polyacrylates. Particular preference is given to polyacrylonitrile.

Polyacrylonitrile is understood in the context of the present invention to mean not just polyacrylonitrile homopolymers but also copolymers of acrylonitrile with 1,3-butadiene or styrene. Preference is given to polyacrylonitrile homopolymers.

In the context of the present invention, polyethylene is understood to mean not just homopolyethylene but also copolymers of ethylene comprising at least 50 mol % of ethylene in copolymerized form and up to 50 mol % of at least one further comonomer, for example α-olefins such as propylene, butylene (1-butene), 1-hexene, 1-octene, 1-decene, 1-dodecene, 1-pentene, and also isobutene, vinylaromatics, for example styrene, and also (meth)acrylic acid, vinyl acetate, vinyl propionate, $C_1$-$C_{10}$-alkyl esters of (meth)acrylic acid, especially methyl acrylate, methyl methacrylate, ethyl acrylate, ethyl methacrylate, n-butyl acrylate, 2-ethylhexyl acrylate, n-butyl methacrylate, 2-ethylhexyl methacrylate, and also maleic acid, maleic anhydride and itaconic anhydride. Polyethylene may be HDPE or LDPE.

In the context of the present invention, polypropylene is understood to mean not just homopolypropylene but also copolymers of propylene comprising at least 50 mol % of propylene in copolymerized form and up to 50 mol % of at least one further comonomer, for example ethylene and α-olefins such as butylene, 1-hexene, 1-octene, 1-decene, 1-dodecene and 1-pentene. Polypropylene is preferably isotactic or essentially isotactic polypropylene.

In the context of the present invention, polystyrene is understood to mean not just homopolymers of styrene but also copolymers with acrylonitrile, 1,3-butadiene, (meth)acrylic acid, $C_1$-$C_{10}$-alkyl esters of (meth)acrylic acid, divinylbenzene, especially 1,3-divinylbenzene, 1,2-diphenylethylene and α-methylstyrene.

Another preferred binder (iv) is polybutadiene.

Other suitable binders (iv) are selected from polyethylene oxide (PEO), cellulose, carboxymethylcellulose, polyimides and polyvinyl alcohol.

In one embodiment of the present invention, binder (iv) is selected from those (co)polymers having a mean molecular weight $M_w$ in the range from 50 000 to 1 000 000 g/mol, preferably to 500 000 g/mol.

Binders (iv) may be crosslinked or uncrosslinked (co)polymers.

In a particularly preferred embodiment of the present invention, binder (iv) is selected from halogenated (co)polymers, especially from fluorinated (co)polymers. Halogenated or fluorinated (co)polymers are understood to mean those (co)polymers comprising, in copolymerized form, at least one (co)monomer having at least one halogen atom or at least one fluorine atom per molecule, preferably at least two halogen atoms or at least two fluorine atoms per molecule.

Examples are polyvinyl chloride, polyvinylidene chloride, polytetrafluoroethylene, polyvinylidene fluoride (PVdF), tetrafluoroethylene-hexafluoropropylene copolymers, vinylidene fluoride-hexafluoropropylene copolymers (PVdF-HFP), vinylidene fluoride-tetrafluoroethylene copolymers, perfluoroalkyl vinyl ether copolymers, ethylene-tetrafluoroethylene copolymers, vinylidene fluoride-chlorotrifluoroethylene copolymers and ethylene-chlorofluoroethylene copolymers.

Suitable binders (iv) are especially polyvinyl alcohol and halogenated (co)polymers, for example polyvinyl chloride or polyvinylidene chloride, especially fluorinated (co)polymers such as polyvinyl fluoride and especially polyvinylidene fluoride, and polytetrafluoroethylene.

In one embodiment of the present invention, inventive electrode material comprises:

a total in the range from 60 to 98% by weight, preferably 70 to 96% by weight, of agglomerates of primary particles (i) and primary particles (ii), in the range from 1 to 25% by weight, preferably 2 to 20% by weight, of carbon (iii), in the range from 1 to 20% by weight, preferably 2 to 15% by weight, of binder (iv).

Inventive electrode materials have good usability for production of electrochemical cells. For example, they can be processed to give pastes with good rheological properties.

The present invention further provides electrochemical cells produced using at least one inventive electrode. The present invention further provides electrochemical cells comprising at least one inventive electrode.

A further aspect of the present invention is an electrode comprising agglomerates of primary particles (i) and primary particles (ii), carbon (iii) and at least one binder (iv).

Agglomerates of primary particles (i) and primary particles (ii), carbon (iii) and binder (iv) have been described above.

The geometry of inventive electrodes can be selected within wide limits. It is preferable to configure inventive electrodes in thin films, for example in films with a thickness in the range from 10 μm to 250 μm, preferably 20 to 130 μm.

In one embodiment of the present invention, inventive electrodes comprise a foil, for example a metal foil, especially an aluminum foil, or a polymer film, for example a polyester film, which may be untreated or siliconized. The film is coated on one or both sides with inventive electrode material.

A further aspect of the present invention is the use of inventive electrode materials for production of electrodes of lithium ion batteries. A further aspect of the present invention is a process for producing electrodes using inventive electrode materials.

Inventive electrodes in inventive electrochemical cells serve by definition as cathodes. Inventive electrochemical cells comprise a counterelectrode, which is defined in the context of the present invention as the anode and which may be, for example, a carbon anode, especially a graphite anode, a lithium anode, a silicon anode or a lithium titanate anode.

The inventive electrochemical cells may, for example, be batteries or accumulators.

Inventive electrochemical cells may, as well as anode and inventive electrode, comprise further constituents, for example conductive salt, nonaqueous solvent, separator, output conductor, for example composed of a metal or an alloy, and also cable connections and housing.

In one embodiment of the present invention, inventive electrical cells comprise at least one nonaqueous solvent which may be liquid or solid at room temperature, preferably selected from polymers, cyclic and noncyclic ethers, cyclic and noncyclic acetals and cyclic and noncyclic organic carbonates.

Examples of suitable polymers are especially polyalkylene glycols, preferably poly-$C_1$-$C_4$-alkylene glycols and especially polyethylene glycols. These polyethylene glycols may comprise up to 20 mol % of one or more $C_1$-$C_4$-alkylene glycols in copolymerized form. The polyalkylene glycols are preferably polyalkylene glycols double-capped by methyl or ethyl.

The molecular weight $M_w$ of suitable polyalkylene glycols and especially of suitable polyethylene glycols may be at least 400 g/mol.

The molecular weight $M_w$ of suitable polyalkylene glycols and especially of suitable polyethylene glycols may be up to 5 000 000 g/mol, preferably up to 2 000 000 g/mol.

Examples of suitable noncyclic ethers are, for example, diisopropyl ether, di-n-butyl ether, 1,2-dimethoxyethane, 1,2-diethoxyethane, preference being given to 1,2-dimethoxyethane.

Examples of suitable cyclic ethers are tetrahydrofuran and 1,4-dioxane.

Examples of suitable noncyclic acetals are, for example, dimethoxymethane, diethoxymethane, 1,1-dimethoxyethane and 1,1-diethoxyethane.

Examples of suitable cyclic acetals are 1,3-dioxane and especially 1,3-dioxolane.

Examples of suitable noncyclic organic carbonates are dimethyl carbonate, ethyl methyl carbonate and diethyl carbonate.

Examples of suitable cyclic organic carbonates are compounds of the general formulae (II) and (III)

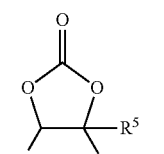

(II)

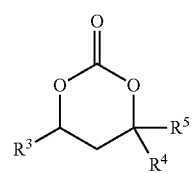

(III)

in which $R^3$, $R^4$ and $R^5$ may be the same or different and are selected from hydrogen and $C_1$-$C_4$-alkyl, for example methyl, ethyl, n-propyl, isopropyl, n-butyl, isobutyl, sec-butyl and tert-butyl, where $R^4$ and $R^5$ are preferably not both tert-butyl.

In particularly preferred embodiments, $R^3$ is methyl and $R^4$ and $R^5$ are each hydrogen, or $R^5$, $R^3$ and $R^4$ are each hydrogen.

Another preferred cyclic organic carbonate is vinylene carbonate, formula (IV).

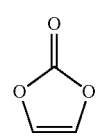

(IV)

The solvent(s) is (are) preferably used in what is known as the anhydrous state, i.e. with a water content in the range from 1 ppm to 0.1% by weight, determinable, for example, by Karl Fischer titration.

Inventive electrochemical cells further comprise at least one conductive salt. Suitable conductive salts are especially lithium salts. Examples of suitable lithium salts are $LiPF_6$, $LiBF_4$, $LiClO_4$, $LiAsF_6$, $LiCF_3SO_3$, $LiC(C_nF_{2n+1}SO_2)_3$, lithium imides such as $LiN(C_nF_{2n+1}SO_2)_2$, where n is an integer in the range from 1 to 20, $LiN(SO_2F)_2$, $Li_2SiF6$, $LiSbF_6$, $LiAlCl_4$, and salts of the general formula $(C_nF_{2n+1}SO_2)_m YLi$, where m is defined as follows:

m=1 when Y is selected from oxygen and sulfur,
m=2 when Y is selected from nitrogen and phosphorus, and
m=3 when Y is selected from carbon and silicon.

Preferred conductive salts are selected from $LiC(CF_3SO_2)_3$, $LiN(CF_3SO_2)_2$, $LiPF_6$, $LiBF_4$, $LiClO_4$, and particular preference is given to $LiPF_6$ and $LiN(CF_3SO_2)_2$.

In one embodiment of the present invention, inventive electrochemical cells comprise one or more separators by which the electrodes are mechanically separated. Suitable separators are polymer films, especially porous polymer films, which are unreactive toward metallic lithium. Particularly suitable materials for separators are polyolefins, especially porous polyethylene in film form and porous polypropylene in film form.

Separators made from polyolefin, especially made from polyethylene or polypropylene, may have a porosity in the range from 35 to 45%. Suitable pore diameters are, for example, in the range from 30 to 500 nm.

In another embodiment of the present invention, it is possible to select separators from PET nonwovens filled with inorganic particles. Such separators may have a porosity in the range from 40 to 55%. Suitable pore diameters are, for example, in the range from 80 to 750 nm.

Inventive electrochemical cells further comprise a housing which may have any desired shape, for example cuboidal or the shape of a cylindrical sheet. In one variant, the housing used is a metal foil elaborated as a pouch.

Inventive electrochemical cells can be combined with one another, for example in series connection or in parallel connection. Series connection is preferred.

The present invention further provides for the use of inventive electrochemical cells in devices, especially in mobile devices. Examples of mobile devices are vehicles, for example automobiles, bicycles, aircraft, or water vehicles such as boats or ships. Other examples of mobile devices are those which are moved manually, for example computers, especially laptops, telephones, or power tools, for example from the building sector, especially drills, battery-powered combination drills or battery-powered tackers.

A further aspect of the present invention is lithium ion batteries comprising at least one electrode comprising at least one inventive electrode material. A further aspect of the present invention is accordingly lithium ion batteries comprising at least one inventive electrode.

A further aspect of the present invention is the use of inventive lithium ion batteries in devices which require batteries having a high peak power and hence a rapid discharge. Examples of such devices are drills, battery-powered combination drills or battery-powered tackers or starter motors for cold starting of motor vehicles, for example automobiles or motorbikes. Inventive lithium ion batteries have a high peak power. Preferably, the discharge rate at least briefly exceeds 5 C. Inventive lithium ion batteries can also be discharged rapidly if desired. For example, they can be discharged with only a slight fall in capacity at 5 C within 12 minutes, preferably at 10 C within 6 minutes.

The invention is illustrated by working examples.

Working Examples

I. Production of an Electrode Material

I.1 Production of Inventive Electrode Material EM.1

In step (a.1), the following starting materials were used:

| | |
|---|---|
| 4.58 kg | of $H_3PO_3$ (A.1) |
| 6.38 kg | of $H_3PO_4$ (A.2) |
| 4.79 g | of LiOH • $H_2O$ (B.1) |
| 2.64 kg | of lactose (C.1) |
| 3.12 kg | of iron citrate (D1.1) |
| 8.83 kg | of α-FeOOH (D2.1) |

First of all, 108.8 kg of demineralized water were initially charged in a 200 liter stirred jacketed vessel with an anchor stirrer and heated to 52° C. Subsequently, the LiOH.$H_2O$ (B.1) was dissolved therein and then the iron compounds (D1.1) and (D2.1) were added. Thereafter, phosphorus compounds (A.1) and (A.2) were added. The temperature rose to 68° C. Thereafter, carbon source (C.1) was added. The mixture was stirred at 70° C. over a period of fourteen hours (pH: 4.5). This gave a yellow suspension.

Drying

The solution from step (a.1) was sprayed under air in a programmed spray tower. The hot air stream had a temperature of 305° C. on input and still had a temperature of 121° C. on output. The dryer was operated with 450 kg/h of drying gas and 33 kg/h of nozzle gas (atomization gas) with an atomization pressure of 3.5 bar.

This gave a yellow, free-flowing powder with a residual moisture content of 8%. It was in the form of particles of diameter (D50) 22.6 μm. SEM images showed spherical agglomerates of the yellow powder which were held together internally by the organic lactose constituent.

Step (b.1)

60 g of the yellow powder obtained as described above were thermally treated in a 2 l quartz rotary sphere furnace under an $N_2$ atmosphere. The 2 l quartz rotary sphere rotated at a speed of 10 revolutions/min. First of all, the furnace was heated to 700° C. within 60 minutes. Then calcination was effected at 700° C. for 60 minutes. Thereafter, the furnace was allowed to cool to room temperature. Sieving (50 μm mesh) was effected to obtain an inventive electrode material EM.1 which appeared black and was obtained in pulverulent form. BET: 26 $m^2$/g.

The tamped density of the <32 μm sieve fraction was 0.73 g/ml.

I.2 Production of Comparative Electrode Material C-EM.2

In step (a.2), the following starting materials were used:

| | |
|---|---|
| 5.33 kg | of $H_3PO_3$ (A.1) |
| 7.43 kg | of $H_3PO_4$ (A.2) |
| 5.57 g | of LiOH • $H_2O$ (B.1) |
| 4.11 kg | of mannitol (C.2) |
| 11.42 kg | of α-FeOOH (D2.1) |

First of all, 128 kg of demineralized water were initially charged in a 200 liter stirred jacketed vessel with an anchor stirrer and heated to 57° C. Subsequently, the LiOH $H_2O$ (B.1) was dissolved therein and then the iron compound (D2.1) was added. Thereafter, phosphorus compounds (A.1) and (A.2) were added. The temperature rose to 76° C. Thereafter, carbon source (C.2) was added. The mixture was stirred at 70° C. over a period of fourteen hours (pH: 4.6). This gave a yellow suspension.

Drying

The solution from step (a.2) was sprayed under air in a programmed spray tower. The hot air stream had a temperature of 305° C. on input and still had a temperature of 121° C. on output. The dryer was operated with 450 kg/h of drying gas and 33 kg/h of nozzle gas (atomization gas) with an atomization pressure of 3.5 bar.

This gave a yellow, free-flowing powder with a residual moisture content of 8%. It was in the form of particles of diameter (D50) 18.3 μm. SEM images showed spherical agglomerates of the yellow powder which were held together internally by the organic mannitol constituent.

Step (b.2)

60 g of the yellow powder obtained as described above were thermally treated in a 2 l quartz rotary sphere furnace under an $N_2$ atmosphere. The 2 l quartz rotary sphere rotated at a speed of 10 revolutions/min. First of all, the furnace was heated to 700° C. within 60 minutes. Then calcination was effected at 700° C. for 60 minutes. Thereafter, the furnace was allowed to cool to room temperature. Sieving (50 μm mesh) was effected to obtain an electrode material C-EM.2 which appeared black and was obtained in pulverulent form. BET: 9.1 m²/g. The tamped density of the <32 μm sieve fraction was 1.01 g/ml.

I.3 Production of Comparative Electrode Material C-EM.3

In step (a.3), the following starting materials were used:

| | |
|---|---|
| 5.66 kg | of $H_3PO_3$ (A.1) |
| 7.89 kg | of $H_3PO_4$ (A.2) |
| 5.92 g | of LiOH • $H_2O$ (B.1) |
| 2.17 kg | of lactose (C.1) |
| 2.00 kg | of starch (C.3) |
| 12.14 kg | of α-FeOOH (D2.1) |

First of all, 136 kg of demineralized water were initially charged in a 200 liter stirred jacketed vessel with an anchor stirrer and heated to 53° C. Subsequently, the LiOH.$H_2O$ (B.1) was dissolved therein and then the iron compound (D2.1) was added. Thereafter, phosphorus compounds (A.1) and (A.2) were added. The temperature rose to 69° C. Thereafter, carbon sources (C.1) and (C.3) were added. The mixture was stirred at 70° C. over a period of fourteen hours (pH: 4.6). This gave a yellow suspension.

Drying

The solution from step (a.3) was sprayed under air in a programmed spray tower. The hot air stream had a temperature of 305° C. on input and still had a temperature of 121° C. on output. The dryer was operated with 450 kg/h of drying gas and 33 kg/h of nozzle gas (atomization gas) with an atomization pressure of 3.5 bar.

This gave a yellow, free-flowing powder with a residual moisture content of 8%. It was in the form of particles of diameter (D50) 8.5 μm. SEM images showed spherical agglomerates of the yellow powder which were held together internally by the organic lactose/starch constituent.

Step (b.3)

60 g of the yellow powder obtained as described above were thermally treated in a 2 l quartz rotary sphere furnace under an $N_2$ atmosphere. The 2 l quartz rotary sphere rotated at a speed of 10 revolutions/min. First of all, the furnace was heated to 700° C. within 60 minutes. Then calcination was effected at 700° C. for 60 minutes. Thereafter, the furnace was allowed to cool to room temperature. Sieving (50 μm mesh) was effected to obtain an electrode material C-EM.3 which appeared black and was obtained in pulverulent form. BET: 28 m²/g. The tamped density of the <32 μm sieve fraction was 0.81 g/ml.

I.4 Production of Comparative Electrode Material C-EM.4

In step (a.4), the following starting materials were used:

| | |
|---|---|
| 5.73 kg | of $H_3PO_3$ (A.1) |
| 8.02 kg | of $H_3PO_4$ (A.2) |
| 6.01 g | of LiOH • $H_2O$ (B.1) |
| 1.38 kg | of lactose (C.1) |
| 1.24 kg | of starch (C.3) |
| 12.53 kg | of α-FeOOH (D2.1) |

First of all, 136 kg of demineralized water were initially charged in a 200 liter stirred jacketed vessel with an anchor stirrer and heated to 44° C. Subsequently, the LiOH.$H_2O$ (B.1) was dissolved therein and then the iron compound (D2.1) was added. Thereafter, phosphorus compounds (A.1) and (A.2) were added. The temperature rose to 62° C. Thereafter, carbon sources (C.1) and (C.3) were added. The mixture was stirred at 70° C. over a period of fourteen hours (pH: 4.6). This gave a yellow suspension.

Drying

The solution from step (a.4) was diluted with 4 l of water and then sprayed under air in a programmed spray tower. The hot air stream had a temperature of 305° C. on input and still had a temperature of 121° C. on output.

The dryer was operated with 450 kg/h of drying gas and 33 kg/h of nozzle gas (atomization gas) with an atomization pressure of 3.5 bar.

This gave a yellow, free-flowing powder with a residual moisture content of 8%. It was in the form of particles of diameter (D50) 6.3 μm and (D90) 19.4 μm. SEM images showed spherical agglomerates of the yellow powder which were held together internally by the organic starch/lactose constituent.

Step (b.4)

60 g of the yellow powder obtained as described above were thermally treated in a 2 l quartz rotary sphere furnace under an $N_2$ atmosphere. The 2 l quartz rotary sphere rotated at a speed of 10 revolutions/min. First of all, the furnace was heated to 700° C. within 60 minutes. Then calcination was effected at 700° C. for 60 minutes. Thereafter, the furnace was allowed to cool to room temperature. Sieving (50 μm mesh) was effected to obtain an electrode material C-EM.4 which appeared black and was obtained in pulverulent form with a bimodal particle size distribution. BET: 9.1 m²/g. The tamped density of the <32 μm sieve fraction was 1.01 g/ml.

I.5 Production of Comparative Electrode Material C-EM.5

In step (a.5), the following starting materials were used:

| | |
|---|---|
| 4.53 kg | of $H_3PO_3$ (A.1) |
| 6.31 kg | of $H_3PO_4$ (A.2) |
| 4.74 g | of LiOH • $H_2O$ (B.1) |
| 1.92 kg | of polyvinyl alcohol (C.4) |
| 12.53 kg | of α-FeOOH (D2.1) |

First of all, 108 kg of demineralized water were initially charged in a 200 liter stirred jacketed vessel with an anchor stirrer and heated to 47° C. Subsequently, the LiOH.$H_2O$ (B.1) was dissolved therein and then the iron compound (D2.1) was added. Thereafter, phosphorus compounds (A.1) and (A.2) were added. The temperature rose to 63° C. Thereafter, carbon source (C.4) was added. The mixture was stirred at 70° C. over a period of fourteen hours (pH: 4.5). This gave a yellow suspension.

Drying

The pH of the solution from step (a.5) was adjusted to 5.0 with aqueous ammonia. Thereafter, the solution thus obtained was sprayed under air in a programmed spray tower. The hot air stream had a temperature of 305° C. on input and still had a temperature of 121° C. on output. The dryer was operated with 450 kg/h of drying gas and 33 kg/h of nozzle gas (atomization gas) with an atomization pressure of 3.5 bar.

This gave a yellow, free-flowing powder with a residual moisture content of 8%. It was in the form of particles of diameter (D50) 18.3 μm. SEM images showed spherical agglomerates of the yellow powder which were held together internally by the organic polyvinyl alcohol constituent.

Step (b.5)

60 g of the yellow powder obtained as described above were thermally treated in a 2 l quartz rotary sphere furnace under an $N_2$ atmosphere. The 2 l quartz rotary sphere rotated at a speed of 10 revolutions/min. First of all, the furnace was heated to 700° C. within 60 minutes. Then calcination was effected at 700° C. for 60 minutes. Thereafter, the furnace was allowed to cool to room temperature. Sieving (50 μm mesh) was effected to obtain an electrode material C-EM.5 which appeared black and was obtained in pulverulent form. BET: 8.9 m$^2$/g. The tamped density of the <32 μm sieve fraction was 0.85 g/ml.

I.6 Production of Comparative Electrode Material C-EM.6

In step (a.6), the following starting materials were used:

| | |
|---|---|
| 4.58 kg | of H$_3$PO$_3$ (A.1) |
| 6.38 kg | of H$_3$PO$_4$ (A.2) |
| 4.78 g | of LiOH • H$_2$O (B.1) |
| 1.39 kg | of stearic acid (C.5) |
| 9.81 kg | of α-FeOOH (D2.1) |

First of all, 108 kg of demineralized water were initially charged in a 200 liter stirred jacketed vessel with an anchor stirrer and heated to 47° C. Subsequently, the LiOH.H$_2$O (B.1) was dissolved therein and then the iron compound (D2.1) was added. Thereafter, phosphorus compounds (A.1) and (A.2) were added. The temperature rose to 56° C. Thereafter, carbon source (C.5) was added. The mixture was stirred at 70° C. over a period of fourteen hours (pH: 4.5). This gave a yellow suspension.

Drying

The solution from step (a.6) was diluted with 8 l of water. Thereafter, the pH of the solution thus diluted from step (a.6) was adjusted to 5.0 with aqueous ammonia. Thereafter, the solution thus obtained was sprayed under air in a programmed spray tower. The hot air stream had a temperature of 305° C. on input and still had a temperature of 121° C. on output. The dryer was operated with 450 kg/h of drying gas and 33 kg/h of nozzle gas (atomization gas) with an atomization pressure of 3.5 bar.

This gave a yellow, free-flowing powder with a residual moisture content of 8%. It was in the form of particles of diameter (D50) 14 μm. SEM images showed spherical agglomerates of the yellow powder which were held together internally by the organic stearic acid constituent.

Step (b.6)

60 g of the yellow powder obtained as described above were thermally treated in a 2 l quartz rotary sphere furnace under an N$_2$ atmosphere. The 2 l quartz rotary sphere rotated at a speed of 10 revolutions/min. First of all, the furnace was heated to 700° C. within 60 minutes. Then calcination was effected at 700° C. for 60 minutes. Thereafter, the furnace was allowed to cool to room temperature. Sieving (50 μm mesh) was effected to obtain an electrode material C-EM.6 which appeared light gray and was obtained in pulverulent form. BET: 4.1 m$^2$/g. The tamped density of the <32 μm sieve fraction was 0.95 g/ml.

I.7 Production of Comparative Electrode Material C-EM.7

In step (a.7), the following starting materials were used:

| | |
|---|---|
| 4.53 kg | of H$_3$PO$_3$ (A.1) |
| 6.31 kg | of H$_3$PO$_4$ (A.2) |
| 4.74 g | of LiOH • H$_2$O (B.1) |
| 1.74 kg | of lactose (C.1) |
| 1.75 kg | of mannitol (C.2) |
| 9.71 kg | of α-FeOOH (D2.1) |

First of all, 108 kg of demineralized water were initially charged in a 200 liter stirred jacketed vessel with an anchor stirrer and heated to 43° C. Subsequently, the LiOH.H$_2$O (B.1) was dissolved therein and then the iron compound (D2.1) was added. Thereafter, phosphorus compounds (A.1) and (A.2) were added. The temperature rose to 56° C. Thereafter, carbon sources (C.1) and (C.2) were added. The mixture was stirred at 70° C. over a period of fourteen hours (pH: 4.6). This gave a yellow suspension.

Drying

The solution from step (a.7) was diluted with 8 l of water. Thereafter, the solution thus obtained was sprayed under air in a programmed spray tower. The hot air stream had a temperature of 305° C. on input and still had a temperature of 121° C. on output. The dryer was operated with 450 kg/h of drying gas and 33 kg/h of nozzle gas (atomization gas) with an atomization pressure of 3.5 bar.

This gave a yellow, free-flowing powder with a residual moisture content of 8%. It was in the form of particles of diameter (D50) 15.8 μm. SEM images showed spherical agglomerates of the yellow powder which were held together internally by the organic lactose/mannitol constituent.

Step (b.7)

60 g of the yellow powder obtained as described above were thermally treated in a 2 l quartz rotary sphere furnace under an N$_2$ atmosphere. The 2 l quartz rotary sphere rotated at a speed of 10 revolutions/min. First of all, the furnace was heated to 700° C. within 60 minutes. Then calcination was effected at 700° C. for 60 minutes. Thereafter, the furnace was allowed to cool to room temperature. Sieving (50 μm mesh) was effected to obtain an electrode material C-EM.7 which appeared black and was obtained in pulverulent form. BET: 11 m$^2$/g. The tamped density of the <32 μm sieve fraction was 1.11 g/ml.

II. Production of Inventive Electrochemical Cells

Inventive electrode material was processed with a binder (iv.1): copolymer of vinylidene fluoride and hexafluoropropene, as a powder, commercially available as Kynar Flex® 2801 from Arkema, Inc., as follows.

To determine the electrochemical data of the electrode materials, 8 g of inventive electrode material from step EM.1 and 1 g of (iv.1) were mixed with addition of 1 g of N-methylpyrrolidone (NMP) and 1 g of carbon black to give a paste. An aluminum foil of thickness 30 μm was coated with the above-described paste (active material loading 4 mg/cm$^2$). After drying, but without compression, circular portions of the aluminum foil thus coated (diameter 20 mm) were punched out at 105° C. The electrodes thus obtainable were used to produce electrochemical cells. The electrolyte used was a 1 mol/l solution of LiPF$_6$ in ethylene carbonate/dimethyl carbonate (1:1 based on parts by mass). The anode of the test cells consisted of a lithium foil which is in contact with the cathode foil via a separator made from glass fiber paper.

This gives inventive electrochemical cells EC.1.

When inventive electrochemical cells were cycled (charging/discharging) between 3 V and 4 V at 25° C. with different rates (0.1-6.5 C, 1 C=160 mAh/g), a rise in the capacity was found at high discharge rates (6.5 C); see table 1.

TABLE 1

| | Discharge rates at high capacity | | |
|---|---|---|---|
| Example | Discharge rate 0.1 C. Capacity [mAh/g] | Discharge rate 0.2 C. Capacity [mAh/g] | Discharge rate 6.5 C. Capacity [mAh/g] |
| EM.1 | 147 | 146 | 101 |
| C-EM.2 | 147 | 144 | 89 |
| C-EM.3 | 138 | 137 | 81 |

TABLE 1-continued

| | Discharge rates at high capacity | | |
|---|---|---|---|
| Example | Discharge rate 0.1 C. Capacity [mAh/g] | Discharge rate 0.2 C. Capacity [mAh/g] | Discharge rate 6.5 C. Capacity [mAh/g] |
| C-EM.4 | 139 | 137 | 80 |
| C-EM.5 | 149 | 140 | 26 |
| C-EM.6 | 143 | 137 | 58 |
| C-EM.7 | 144 | 141 | 74 |

III.1 Production of Inventive Electrode Material EM.8
In step (a.8), the following starting materials were used:

| | |
|---|---|
| 29.10 g | of $H_3PO_3$ (A.1) |
| 39.42 g | of $H_3PO_4$ (A.2) |
| 29.99 g | of LiOH • $H_2O$ (B.1) |
| 16.18 g | of iron citrate (D1.1) |
| 57.44 g | of α-FeOOH (D2.1) |

First of all, 165 g of demineralized water were initially charged at RT. Subsequently, the LiOH $H_2O$ (B.1) was dissolved therein and then the iron compounds (D1.1) and (D2.1) were added. Thereafter, phosphorus compounds (A.1) and (A.2) were added. The mixture was stirred at RT over a period of five hours. This gave a yellow, homogeneous suspension solution.

Step (b.8)—Drying

The solution from step (a.1) was concentrated at max. 85° C. and 10 mbar for about 5 h. This gave a tacky, viscous, yellow material. The latter was dried at 95° C. for about 12 h. A yellow powder was obtained.

Step (c.8)—Calcination 60 g of the powder obtained as described above were thermally treated in a 2 l quartz rotary sphere furnace under an $N_2$ atmosphere. The 2 l quartz rotary sphere furnace rotated at a speed of 10 revolutions/min. First of all, the furnace was heated to 700° C. within 60 minutes. Then calcination was effected at 700° C. for 60 minutes. Thereafter, the furnace was allowed to cool to room temperature.

A portion of the calcined material was comminuted in a mortar and sieved (mesh 40 μm). An inventive electrode material EM.8 was obtained, which appeared black and was obtained in pulverulent form. EM.8 can be processed directly to give a paste of a low viscosity.

FIG. 1 shows a scanning electron micrograph of the electrode material EM.8 obtained. A fine homogeneous material is observed.

III.2 Production of Comparative Electrode Material C-EM.9
In step (a.9), the following starting materials were used:

| | |
|---|---|
| 29.32 g | of $H_3PO_3$ (A.1) |
| 39.45 g | of $H_3PO_4$ (A.2) |
| 30.02 g | of LiOH • $H_2O$ (B.1) |
| 16.15 g | of iron citrate (D1.1) |
| 57.33 g | of α-FeOOH (D2.1) |

First of all, 140 g of ethanol were initially charged at RT. Subsequently, the $LiOH.H_2O$ (B.1) was dissolved therein and then the iron compounds (D1.1) and (D2.1) were added. Thereafter, phosphorus compounds (A.1) and (A.2) were added.

The mixture was stirred at RT over a period of four hours. This gave a yellow, inhomogeneous suspension solution. After the experiment, particles of a dark-colored substance were still present in the reaction mixture. After the additional addition of ethanol, there was no change in the state of the experiment. The reaction mixture is not homogeneous as in the case of preparation of EM.8.

Step (b.9)—Drying

The solution from step (a.1) was concentrated at max. 80° C. and down to 25 mbar for about 5 h. A tacky yellow material was obtained. This was dried in an air circulation oven at 95° C. over a period of 24 hours. A yellow powder was obtained.

Step (c.9)—Calcination 60 g of the material as described above were thermally treated in a 2 l quartz rotary sphere furnace under an $N_2$ atmosphere. The 2 l quartz rotary sphere furnace rotated at a speed of 10 revolutions/min. First of all, the furnace was heated to 700° C. within 60 minutes. Then calcination was effected at 700° C. for 60 minutes. Thereafter, the furnace was allowed to cool to room temperature.

A portion of the calcined material was comminuted in a mortar and sieved (mesh 40 μm). The electrode material C-EM.9 was obtained, which appeared black and was obtained in pulverulent form. C-EM.9 cannot be processed further to give a homogeneous paste having a low viscosity.

Figure 2:
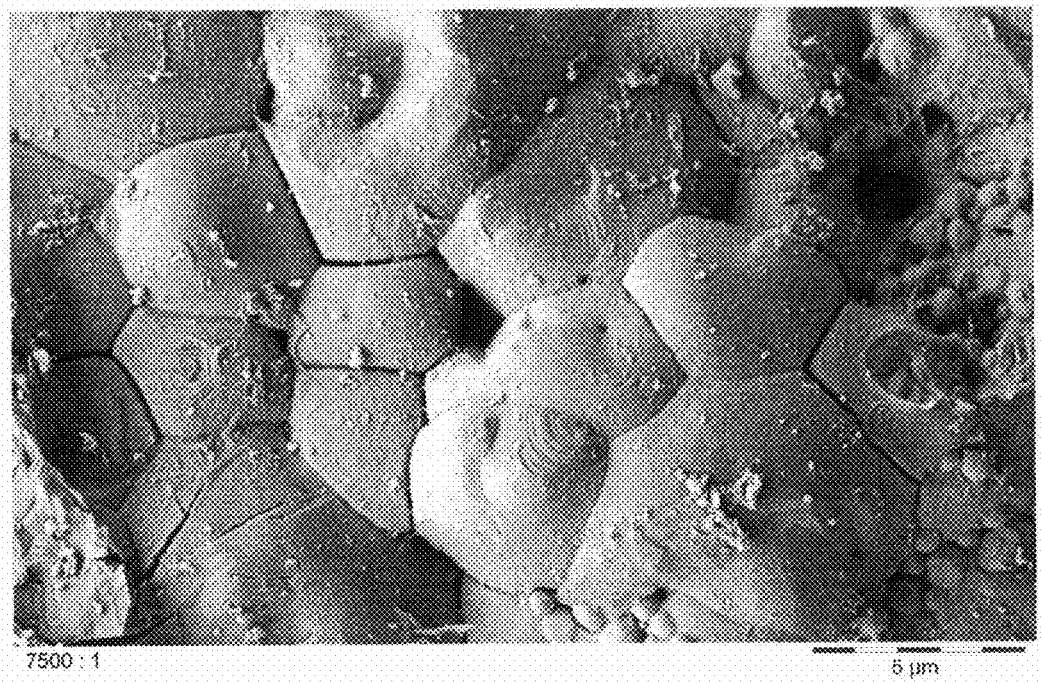

FIG. 2 shows a scanning electron micrograph of the comparative electrode material C-EM.9. Inhomogeneous, interlinked material of coarse structure is observed.

The invention claimed is:

1. An electrode material in particulate form, comprising agglomerates of primary particles (i) of lithiated iron phosphate with olivine structure and primary particles (ii) of lithiated iron phosphate with olivine structure, and
optionally carbon (iii) in an electrically conductive polymorph,
wherein
the primary particles (i) have a D50 in a range of from 20 to 250 nm,
the primary particles (ii) have D50 in a range of from 300 to 1000 nm, and
a volume ratio of the primary particles (i) to the primary particles (ii) ranges from 1:9 to 1:1.

2. An electrode, the electrode material according to claim 1.

3. A lithium ion battery, comprising an electrode comprising the electrode material according to claim 1.

4. The electrode material according to claim 1, comprising the carbon (iii).

5. The electrode material according to claim 4, wherein a weight ratio of a sum of the primary particles (i) and the primary particles (ii) to the carbon (iii) ranges from 200:1 to 5:1.

6. The electrode material according to claim 4, wherein the carbon (iii) is present in the pores of the agglomerates.

7. The electrode material according to claim 4, wherein the carbon is present as particles.

8. The electrode material according to claim 4, wherein the carbon (iii) is present as a complete or partial coating of the agglomerates of the primary particles (i) and the primary particles (ii).

9. The electrode material according to claim 4, further comprising a binder (iv).

10. The electrode material according to claim 9, comprising
from 60 to 98% by weight of the agglomerates of the primary particles (i) and the primary particles (ii),
from 1 to 25% by weight of the carbon (iii), and
from 1 to 20% by weight of the binder (iv).

11. The electrode material according to claim 1, wherein the agglomerates of the primary particles (i) and the primary particles (ii) are in the form of particles which have a mean pore diameter of from 0.05 μm to 2 μm and exhibit a mono- or multimodal profile of intrusion volume of from 100 to 0.001 μm.

12. A process for producing the electrode material according to claim 1, the process comprising:
(a) mixing (A), (B), (C), (D1) and (D2) in the presence of water or in the presence of water and an organic solvent, to obtain a mixture:
   (A) at least one phosphorus compound,
   (B) at least one lithium compound,
   (C) at least one carbon source,
   (D1) at least one water-soluble iron compound in which Fe is present in the +2 or +3 oxidation state,
   (D2) at least one iron source which is different than (D1) and is water-insoluble and in which Fe is present in the zero, +2 or +3 oxidation state, and
(b) thermally treating the mixture obtained.

13. The process according to claim 12, wherein the thermal treatment in (b) is performed at 350 to 1200° C.

14. The process according to claim 12, further comprising removing the water in (a), wholly or in part.

15. The process according to claim 12, wherein at least two phosphorus compounds (A) are mixed.

16. The process according to claim 12, wherein at least two carbon sources (C) are mixed.

17. The process according to claim 12, wherein the water-soluble iron compound (D1) is selected from the group consisting of ammonium iron citrate, iron acetate, $FeSO_4$, iron citrate, iron lactate and iron chloride.

18. The process according to claim 12, wherein the water-insoluble iron compound (D2) is selected from the group consisting of $Fe(OH)_3$, FeOOH, $Fe_2O_3$, $Fe_3O_4$, iron phosphate, iron phosphonate and iron carbonate.

* * * * *